United States Patent [19]
Dolah

[11] Patent Number: 5,852,875
[45] Date of Patent: Dec. 29, 1998

[54] BATTERY POWERED CORING DEVICE

[76] Inventor: Olga H. Dolah, 65 83rd St., Brooklyn, N.Y. 11201

[21] Appl. No.: 855,002
[22] Filed: May 13, 1997
[51] Int. Cl.⁶ .................................................. A47J 25/00
[52] U.S. Cl. ........................................ 30/113.1; 30/277.4
[58] Field of Search ............................. 30/113.1, 272.1, 30/277.4, 276

[56] References Cited

U.S. PATENT DOCUMENTS

| | | | |
|---|---|---|---|
| D. 233,644 | 11/1974 | Montesti et al. | |
| 2,583,577 | 1/1952 | Kingsbury | 30/113.1 |
| 2,749,909 | 6/1956 | Ullery et al. | 30/113.1 |
| 3,164,183 | 1/1965 | Kirkpatrick | 30/113.1 |
| 3,618,208 | 11/1971 | Cronheim | 30/113.1 |
| 3,780,435 | 12/1973 | Farha et al. | 30/113.1 |

*Primary Examiner*—Hwei-Siu Payer

[57] ABSTRACT

A new battery powered coring device for coring vegetables and fruits. The inventive device includes a handle portion and a coring implement detachably connected to the handle portion. An electric motor is mounted within the handle portion and is drivingly connected to the implement for rotating the implement. Power for the motor is supplied by a rechargeable battery which is disposed within the handle portion. Optionally, the coring implement may be replaced by a brush implement to permit the cleaning of various objects with the invention.

12 Claims, 3 Drawing Sheets

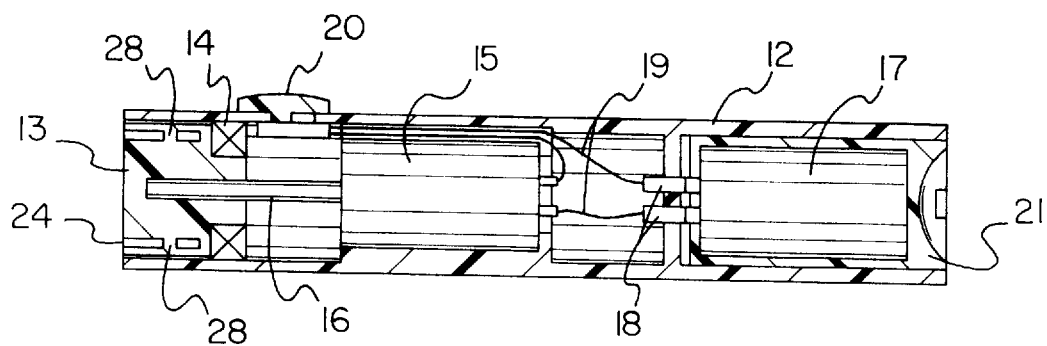
FIG. 3
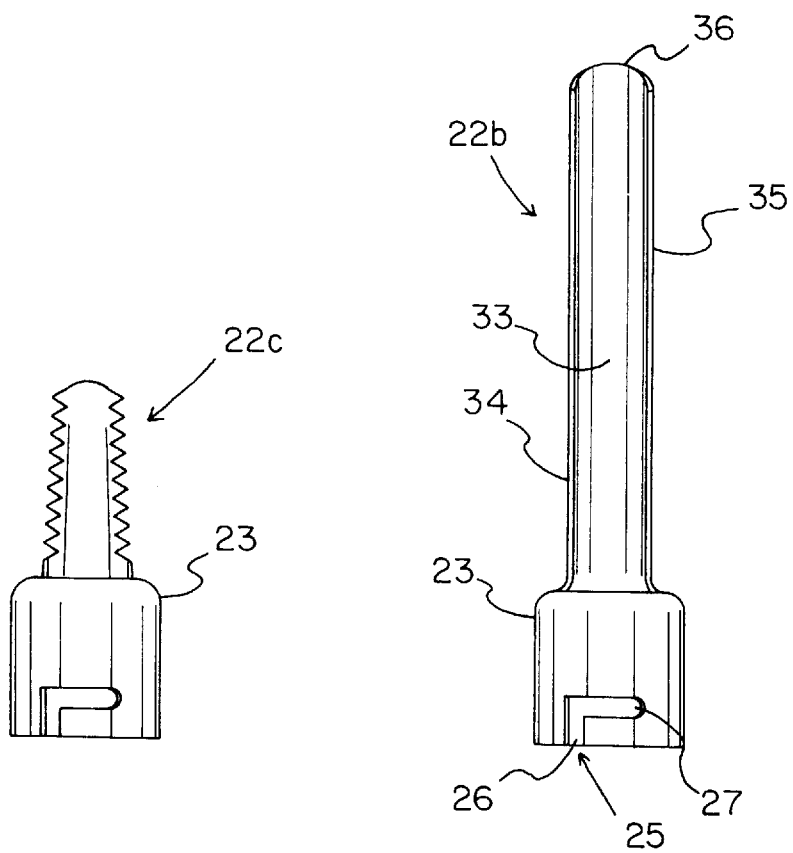
FIG. 5
FIG. 4

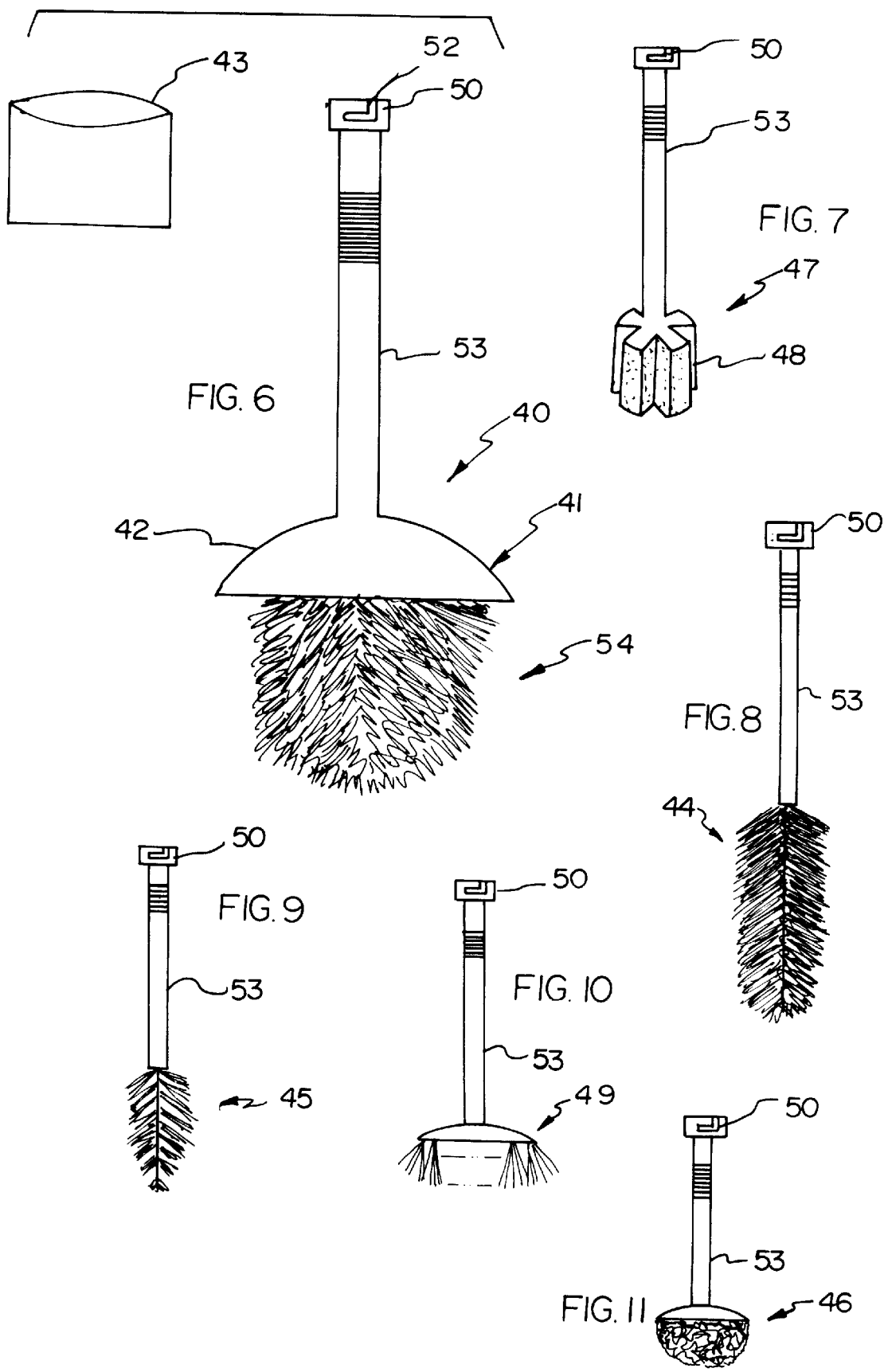

BATTERY POWERED CORING DEVICE

BACKGROUND OF THE INVENTION

1. Field of the Invention

The present invention relates to hand held coring tools and more particularly pertains to a new battery powered coring device for coring vegetables and fruits.

2. Description of the Prior Art

The use of hand held coring tools is known in the prior art. More specifically, hand held coring tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art hand held coring and food preparation tools include U.S. Pat. No. 5,056,223; U.S. Pat. No. 4,596,073; U.S. Pat. No. 4,980,977; U.S. Pat. No. 5,058,273; U.S. Pat. No. 4,310,969; and U.S. Pat. No. Des. 355,339.

While these devices fulfill their respective, particular objectives and requirements, the aforementioned patents do not disclose a new battery powered coring device. The inventive device includes a handle portion and a coring implement detachably connected to the handle portion. An electric motor is mounted within the handle portion and is drivingly connected to the implement for rotating the implement. Power for the motor is supplied by a rechargeable battery which is disposed within the handle portion.

In these respects, the battery powered coring device according to the present invention substantially departs from the conventional concepts and designs of the prior art, and in so doing provides an apparatus primarily developed for the purpose of coring vegetables and fruits.

SUMMARY OF THE INVENTION

In view of the foregoing disadvantages inherent in the known types of hand held coring tools now present in the prior art, the present invention provides a new battery powered coring device construction wherein the same can be utilized for coring vegetables and fruits.

The general purpose of the present invention, which will be described subsequently in greater detail, is to provide a new battery powered coring device which has many of the advantages of the hand held coring tools mentioned heretofore and many novel features that result in a new battery powered coring device which is not anticipated, rendered obvious, suggested, or even implied by any of the prior art hand held coring tools, either alone or in any combination thereof.

To attain this, the present invention generally comprises a handle portion and a coring implement detachably connected to the handle portion. An electric motor is mounted within the handle portion and is drivingly connected to the implement for rotating the implement. Power for the motor is supplied by a rechargeable battery which is disposed within the handle portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new battery powered coring device which has many of the advantages of the hand held coring tools mentioned heretofore and many novel features that result in a new battery powered coring device which is not anticipated, rendered obvious, suggested, or even implied by any of the prior art hand held coring tools, either alone or in any combination thereof.

It is another object of the present invention to provide a new battery powered coring device which may be easily and efficiently manufactured and marketed.

It is a further object of the present invention to provide a new battery powered coring device which is of a durable and reliable construction.

An even further object of the present invention is to provide a new battery powered coring device which is susceptible of a low cost of manufacture with regard to both materials and labor, and which accordingly is then susceptible of low prices of sale to the consuming public, thereby making such battery powered coring device economically available to the buying public.

Still yet another object of the present invention is to provide a new battery powered coring device which provides in the apparatuses and methods of the prior art some of the advantages thereof, while simultaneously overcoming some of the disadvantages normally associated therewith.

Still another object of the present invention is to provide a new battery powered coring device for coring vegetables and fruits.

Yet another object of the present invention is to provide a new battery powered coring device which includes a handle portion and a coring implement detachably connected to the handle portion. An electric motor is mounted within the handle portion and is drivingly connected to the implement for rotating the implement. Power for the motor is supplied by a rechargeable battery which is disposed within the handle portion.

Still yet another object of the present invention is to provide a new battery powered coring device that makes the job of coring easier and faster.

Even still another object of the present invention is to provide a new battery powered coring device that reduces the fatigue on the user compared with manually operated coring devices, especially when coring a large amount of food.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken along line 3—3 of FIG. 2.

FIG. 4 is a view of a coring implement for use with the coring device.

FIG. 5 is a view of another coring implement for use with the coring device.

FIG. 6 is a view of a toilet brush implement for use with the coring device.

FIG. 7 is a view of a sponge brush implement for use with the coring device.

FIG. 8 is a view of a baby bottle brush implement for use with the coring device.

FIG. 9 is a view of a baby bottle nipple brush implement for use with the coring device.

FIG. 10 is a view of a wire brush implement for use with the coring device.

FIG. 11 is a view of a scourers brush implement for use with the coring device.

DESCRIPTION OF THE PREFERRED EMBODIMENT

Figure 1:
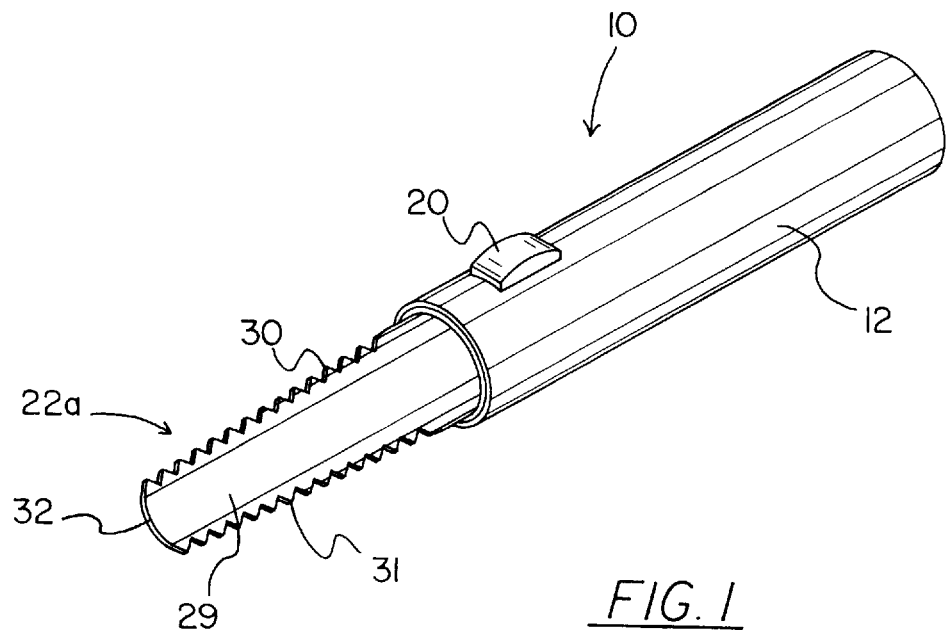
FIG. 1 is a perspective view of a new battery powered coring device according to the present invention.

With reference now to the drawings, and in particular to FIGS. 1 through 11 thereof, a new battery powered coring device embodying the principles and concepts of the present invention and generally designated by the reference numeral 10 will be described.

Figure 2:
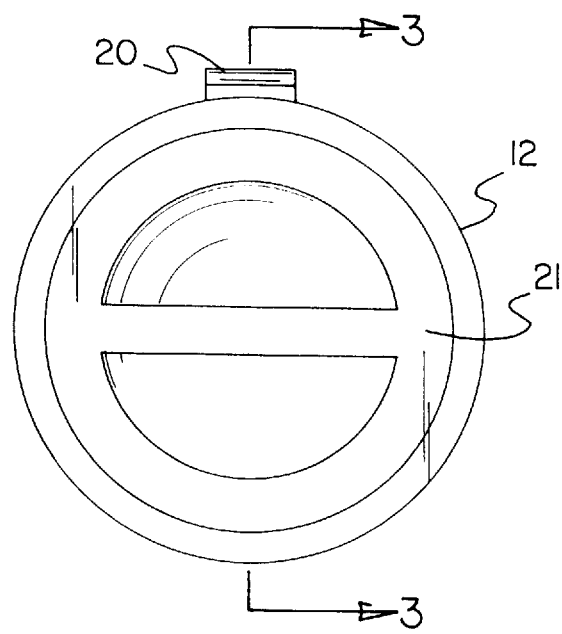
FIG. 2 is a right end view of the coring device of FIG. 1.

As best illustrated in FIGS. 1 through 3, the battery powered coring device 10 comprises a generally elongated, cylindrical handle portion 12 which is sized such that it can be easily held in a user's hand. The handle portion 12 is hollow and includes a mounting hub 13 rotatably mounted therein by a bearing 14. A dc motor 15 is mounted within the handle portion and is drivingly connected to the hub 13 by a drive shaft 16. Electrical power for the motor 15 is supplied by a battery 17 at a base end of the handle portion, with the battery being electrically connected to the motor through electrical contacts 18 and wiring 19. A finger actuated switch 20 is provided in the circuit between the battery 17 and the motor 15 for selectively controlling the flow of electricity to the motor.

The battery 17 is preferably of the rechargeable type, and the base end of the coring device should include means for permitting recharging of the battery when the handle portion 12 is placed within a recharging device, such technology being well known in the art. The base end of the handle portion includes a cap or plug 21 which permits removal of the battery 17 from the handle, or else permits access to the battery.

A coring implement 22a,22b,22c is detachably connected to the hub 13 such that it is rotated by the hub when connected thereto, but which can be removed when not in use. Each implement 22a,22b,22c includes an attachment end for attaching the implement to the hub, and a cutting portion extending from the attachment end. As best shown in FIGS. 4 and 5, the attachment end of each implement comprises a cylindrical sleeve 23 which is sized such that it fits within a circumferential slot 24 in the hub 13. The sleeve 23 includes a pair of diametrically opposite L-shaped attachment slots 25. Each slot 25 includes an axial portion 26 and a circumferential portion 27, which engage with diametrically opposite pegs 28 within the circumferential slot 24 for locking the implement on the hub 13. In order to attach an implement 22a,22b,22c, the sleeve 23 into the slot 24, with the pegs 28 extending into the axial portions 26. The implement is then twisted 90 degrees such that the pegs 28 are disposed in the circumferential portions 27. Thus, the implement cannot be axially pulled from the handle portion. The motor 15 should rotate the hub in the direction such that the pegs are driven to the ends of the portions 27 to retain the implement on the hub.

The details of the cutting portion of the implement 22a is shown in FIG. 1. The implement 22a comprises an arcuate body portion 29 having a pair of serrated side edges 30,31 which are tapered in a direction away from the attachment end, and ending in a rounded tip 32. The rounded tip 32 permits the implement to easily extend into the vegetables and fruit, with the serrated side edges providing a cutting action when the implement is rotated. Note that only the leading edge of the implement needs to be serrated, since the implement is rotated in only one direction. The implement 22c shown in FIG. 5 is similar to the implement 22a, except that the cutting portion is shorter and wider, for use on short and wide vegetables and fruit.

The implement 22b comprises a semi-cylindrical member 33 having straight side edges 34,35 and ending in a rounded tip 36. This implement 22b is useful on vegetables and fruit which are soft and easily cored.

FIGS. 6, 7, 8, 9, 10, 11 depict additional preferred embodiments of the battery power coring device 10 having a brush implement 40 designed for cleaning various objects instead of a coring implement 22. Each of the various alternate embodiments of the brush implement 40 have a brush portion 54 at the end of a elongate shaft 53. The various types of brush implements include a toilet brush implement 41, a baby bottle brush implement 44, a baby bottle nipple brush implement 45, a scourers brush implement 46, a sponge brush implement 47, and a wire brush implement 49.

The toilet brush implement 41 is designed to clean toilet bowls and may include a splash guard 42 and be stored in toilet brush holder 43. The baby bottle brush implement 44 allows for cleaning of jars, blenders, food processors, and thermos interiors. The baby bottle nipple brush implement 45 permits the cleaning of nipples, tiny corners and small objects. The scourers brush implement 46 permits cleaning of pots and pans, including nonstick items. The sponge brush implement 47 includes a sponge 48 to allow the battery powered coring device 10 to clean jars, plates, cups, bottles and other narrow objects. The wire brush implement 49 may be used to clean outdoor stoves and grills.

Similar the coring implements 22, the attachment end of each of the brush implements comprises a cylindrical sleeve 50 which is sized such that it fits within a circumferential slot in the hub 13. The sleeve 50 includes a pair of diametrically opposite L-shaped attachment slots 52 to engage with diametrically opposite pegs 28 within the circumferential slot 24 for locking the brush implement 40 on the hub 13.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coring device, comprising:
   a substantially cylindrical handle portion and a coring implement detachably connected to said handle portion;
   a motor mounted within said handle portion and drivingly connected to said coring implement for rotating the implement;
   a power supply mounted within the handle portion and connected to the motor for supplying power to said motor;
   wherein said coring implement comprises an attachment end formed by a cylindrical sleeve, said cylindrical sleeve being structured to include an elongated slot extending from an end edge thereof for attachment to said handle portion,
   wherein said coring implement further includes a substantially semi-cylindrical cutting portion, said cutting portion extending from the attachment end;
   wherein said motor is an electric motor, and said power supply includes a battery;
   switch means for controlling the supply of power to the motor, said switch means being mounted on said handle portion;
   wherein said attachment slot is L-shaped;
   wherein said cutting portion includes a pair of opposing side edges and a rounded tip;
   wherein said side edges are tapered towards each other such that said cutting portion narrows approaching the rounded tip.

2. The coring device of claim 1 wherein the side edges are serrated.

3. The coring device of claim 1 wherein the side edges are straight.

4. A coring device, comprising:
   a handle portion and a coring implement detachably connected to said handle portion;
   a motor mounted within said handle portion and drivingly connected to said coring implement for rotating the implement;
   a power supply mounted within the handle portion and connected to the motor for supplying power to said motor;
   wherein said coring implement comprises an attachment end formed by a cylindrical sleeve, said cylindrical sleeve being structured to include an elongated slot extending from an end edge thereof for attachment to said handle portion,
   wherein said coring implement further includes a substantially semi-cylindrical cutting portion, said cutting portion extending from the attachment end.

5. The coring device according to claim 4, wherein said motor is an electric motor, and said power supply includes a battery.

6. The coring device according to claim 5, wherein said battery is rechargeable.

7. The coring device according to claim 4, further comprising switch means for controlling the supply of power to the motor, said switch means being mounted on said handle portion.

8. The coring device according to claim 4, wherein said attachment slot is L-shaped.

9. The coring device according to claim 4, wherein said cutting portion includes a pair of opposing side edges and a rounded tip, said side edges being substantially straight.

10. The coring device according to claim 4, wherein said cutting portion includes a pair of opposing side edges and a rounded tip, said side edges being serrated.

11. The coring device according to claim 10, wherein said serrated side edges are tapered such that said cutting portion narrows approaching the rounded tip.

12. The coring device according to claim 1, wherein said handle portion is substantially cylindrical.

* * * * *